G. R. MEYERCORD.
JOINT FOR VITREOUS MATERIAL, MARBLE, OR THE LIKE.
APPLICATION FILED AUG. 31, 1917.
1,355,097.  Patented Oct. 5, 1920.
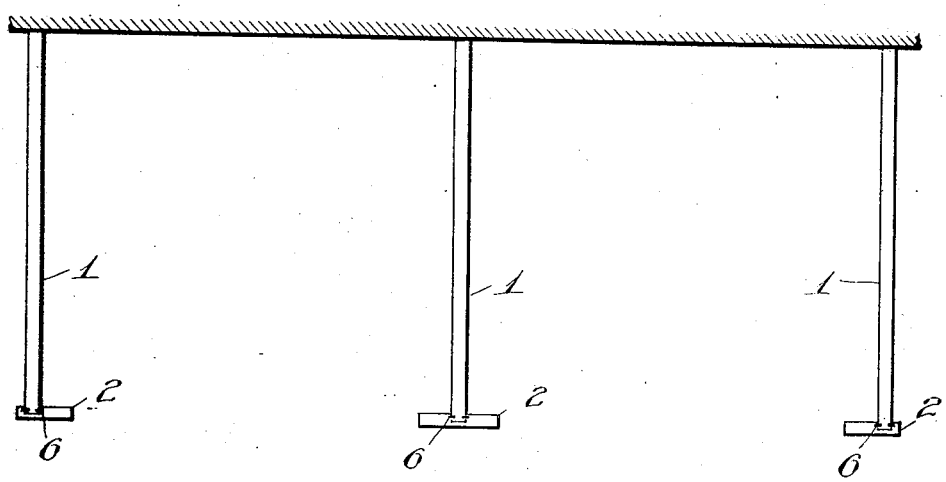
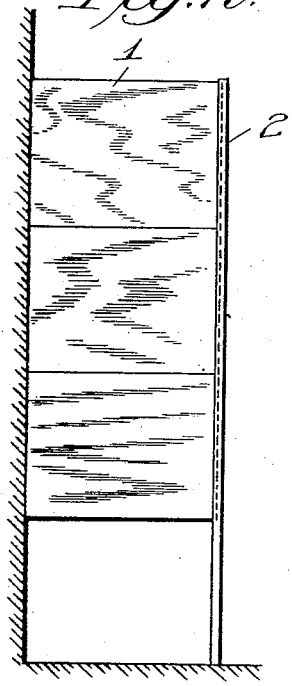
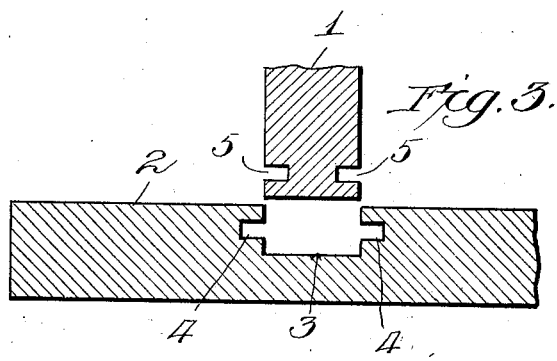
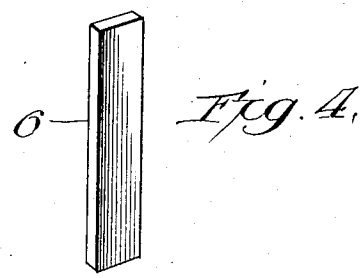
Witness:
Harry S. Gaither
Inventor:
George R. Meyercord
by Chamberlin & Freudenreich
Attys

UNITED STATES PATENT OFFICE.

GEORGE RUDOLPH MEYERCORD, OF CHICAGO, ILLINOIS.

JOINT FOR VITREOUS MATERIAL, MARBLE, OR THE LIKE.

1,355,097.  Specification of Letters Patent.  Patented Oct. 5, 1920.

Application filed August 31, 1917. Serial No. 189,113.

*To all whom it may concern:*

Be it known that I, GEORGE R. MEYERCORD, a citizen of the United States, residing at Chicago, county of Cook, State of Illinois, have invented a certain new and useful Improvement in Joints for Vitreous Material, Marble, or the like, and declare the following to be a full, clear, and exact description of the same, such as will enable others skilled in the art to which it pertains to make and use the same, reference being had to the accompanying drawings, which form a part of this specification.

The object of my invention is to produce a simple means for uniting and supporting slabs of vitreous or other material which will permit booths, inclosures, counters or partitions to be assembled quickly and easily and, when assembled, present smooth, sanitary surfaces having no projecting or exposed metal parts.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of a double booth constructed in accordance with the present invention;

Fig. 2 is a side view looking toward the right from the left hand side of Fig. 1;

Fig. 3 is a plan view, on an enlarged scale, of fragments of two of the elements to be joined together, shown separated from each other; and Fig. 4 is a perspective view of one of the locking pins.

Referring to the drawing, 1 and 2 represent two members, such as slabs of vitreous material or marble which are to form two adjacent sides or parts thereof of a booth or other structure. In the arrangement shown, the member 1 comprises a series of slabs arranged one above the other, while the member 2 is a post-like part.

The member 2 has in one face thereof a channel, 3, whose width is equal to the thickness of the member 1. At the sides of the channel, 3, are opposed small slots or grooves, 4, which are conveniently saw cuts.

The member 1 is provided with slots or grooves, 5, similar to the slots or grooves 4 and so placed that when the member 1 is inserted into the slot, each of the slots or grooves 4 register with one of the slots or grooves 5. The two parts are held together by filling up the registering slots or grooves, 4 and 5. This might be accomplished by pouring in cement or, by the simple expedient of dropping rectangular keys, such as indicated at 6, down each pair of registering slots or grooves; each key having any desired length, but being preferably made short so that any desired length of joint may be made by using the proper number or short keys placed end to end.

Where the member 2 is a post-like member and the member 1 a wall whose lower edge does not reach the floor on which the member 2 rests, the channel 3 will not extend throughout the entire length of the member 2 but will start at a height from the floor equal to that which the lower edge of the member 1 is to have and continue out through the top of the member 2. The several slabs of which the wall 1 is formed may then be inserted one after the other into the upper end of the channel.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A member having a channel in one face thereof, a second member whose thickness is equal to the width of the channel having an end extending into the channel, said members having registering grooves formed respectively, in one of the sides of said second member and in the first member at one side of said channel, and a key arranged in said grooves and locking said members together.

2. A member having a channel formed in one face thereof, a second member whose thickness is equal to the width of the channel having an end extending into the channel, said members having registering grooves at the side of said second member, and keying means having portions lying in both of the grooves to lock said members together.

3. In combination, an upright member having a channel of uniform width in one face thereof, a series of slabs whose thickness is equal to the width of the channel arranged edge to edge and with their ends projecting into said channel, said member and said slabs having registering grooves extending transversely to one of the surfaces bounding the sides of the channel, and a key arranged in said grooves.

In testimony whereof I sign this specification.

GEORGE RUDOLPH MEYERCORD.